(12) United States Patent
McGirr et al.

(10) Patent No.: US 12,140,726 B2
(45) Date of Patent: Nov. 12, 2024

(54) REMOTE MONOSTATIC TOMOGRAPHY SYSTEM AND RELATED METHODS

(71) Applicant: Naval Information Warfare Center Pacific, San Diego, CA (US)

(72) Inventors: Scott C McGirr, San Diego, CA (US); Ronald J Wroblewski, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 192 days.

(21) Appl. No.: 18/152,264

(22) Filed: Jan. 10, 2023

(65) Prior Publication Data

US 2024/0230946 A1    Jul. 11, 2024

(51) Int. Cl.
*G01V 5/00* (2024.01)
*G01V 5/22* (2024.01)
*G01V 5/226* (2024.01)

(52) U.S. Cl.
CPC .............. *G01V 5/226* (2024.01); *G01V 5/224* (2024.01)

(58) Field of Classification Search
None
See application file for complete search history.

(56) References Cited

U.S. PATENT DOCUMENTS

| | | | |
|---|---|---|---|
| 11,632,179 B1* | 4/2023 | Pascoguin | H04B 10/5053 398/188 |
| 2021/0219410 A1* | 7/2021 | Fourmaux | H05G 2/003 |
| 2023/0314108 A1* | 10/2023 | Lynn | G01S 7/4086 342/174 |
| 2024/0205058 A1* | 6/2024 | Howe | H04B 10/524 |

OTHER PUBLICATIONS

J Papeer, M Botton, D Gordon, P Sprangle, A Zigler and Z Henis, "Extended lifetime of high density plasma filament generated by a dual femtosecond-nanosecond laser pulse in air", New Journal of Physics, 2014.
Pavel Polynkin, Miroslav Kolesik, Jerome V. Moloney, Georgios A. Siviloglou, Demetrios N. Christodoulides, "Curved Plasma Channel Generation Using Ultraintense Airy Beams", Science Magazine, Apr. 10, 2014.

* cited by examiner

*Primary Examiner* — Hoon K Song
(74) *Attorney, Agent, or Firm* — Naval Information Warfare Center, Pacific; Kyle Eppele; J. Eric Anderson

(57) ABSTRACT

The present invention relates to a remote tomography system. A filament system generates at least one plurality of plasma filaments. An electromagnetic radiation (EMR) system directs EMR towards the at least one plurality of plasma filaments such that the EMR reflects off of the at least one plurality of plasma filaments towards at least one target region. The EMR system is configured to receive EMR reflected from the at least one plurality of plasma filaments such that EMR reflecting from the at least one target region can be directed towards the EMR system.

14 Claims, 7 Drawing Sheets

REMOTE MONOSTATIC TOMOGRAPHY SYSTEM AND RELATED METHODS

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 109421) is assigned to the United States Government and is available for licensing for commercial purposes. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil.

BACKGROUND OF THE INVENTION

Tomography of remote or hard to reach regions can be a difficult, time consuming, and expensive process. Aerial tomography can be used in these regions, but aircraft can be prohibitively expensive and unmanned aerial vehicles can be slow and inefficient. Both solutions can result in scheduling difficulties, particularly if numerous tomography projects are expected over an extended period of time or locations. What is needed is a flexible solution to image remote regions without the need to flyover the regions.

SUMMARY OF THE INVENTION

The present invention relates to a remote tomography system that can be both stationary and monostatic. Exemplary systems create at least one plane of plasma that can be used to reflect electromagnetic radiation (EMR) towards a target region. By utilizing plasma planes, a target region can be interrogated without needing to approach or fly over the region. Utilizing ground penetrating radar (GPR), exemplary systems can be used from land platforms to uncover man made artifacts such as buried buildings or natural phenomena such as underground oil or mineral deposits. Exemplary systems can be used from sea platforms to examine coastal areas for natural or manmade obstacles and other features. Exemplary systems do not require apparatus motion but can leverage platform mobility to examine wider areas.

According to an illustrative embodiment of the present disclosure, a filament system generates at least one plurality of plasma filaments. An electromagnetic radiation (EMR) system directs EMR towards the at least one plurality of plasma filaments such that the EMR reflects off of the at least one plurality of plasma filaments towards at least one target region. The EMR system is configured to receive EMR reflected from the at least one plurality of plasma filaments such that EMR reflecting from the at least one target region can be directed towards the EMR system.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

Throughout the several views, like elements are referenced using like references. The elements in the figures are not drawn to scale and some dimensions are exaggerated for clarity.

The detailed description of the invention particularly refers to the accompanying figures in which.

DETAILED DESCRIPTION OF THE INVENTION

Figure 1:
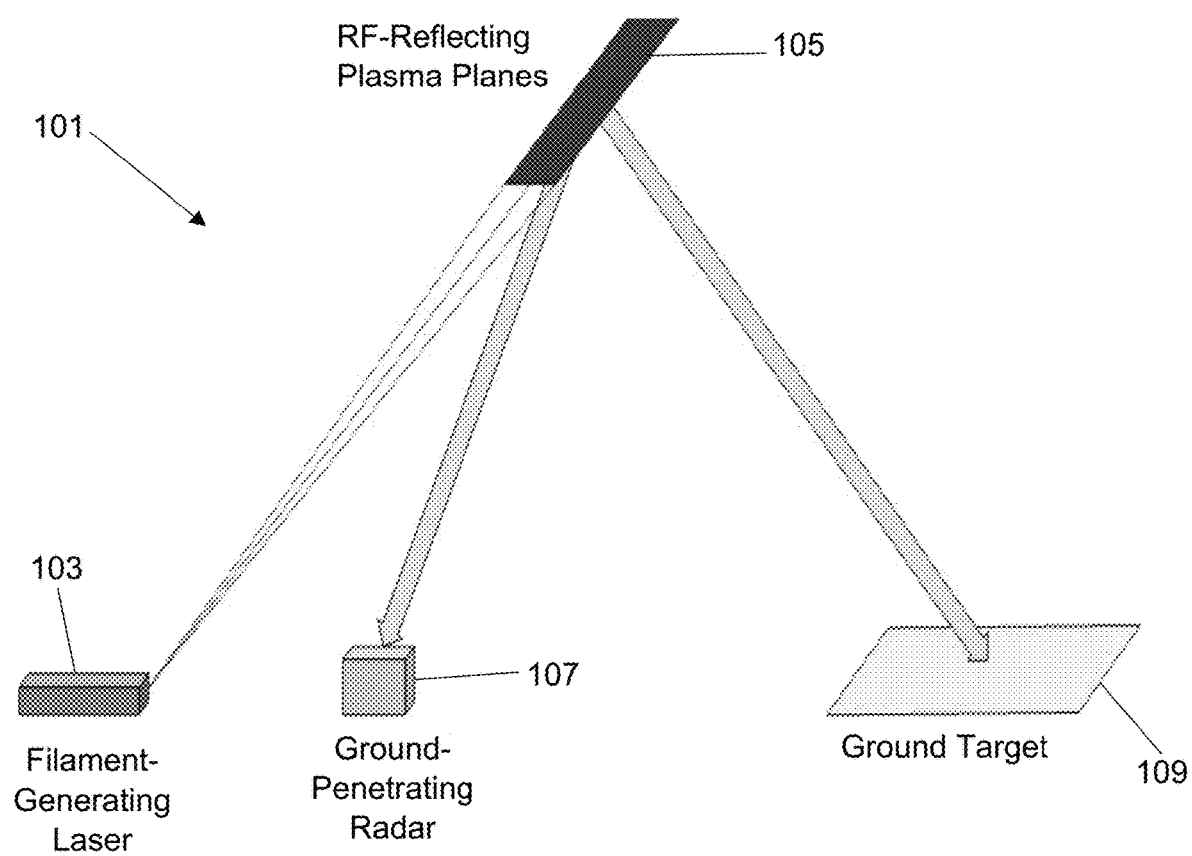
FIG. 1 shows an overview of an exemplary tomography system operating with a single plasma plane.

The embodiments of the invention described herein are not intended to be exhaustive or to limit the invention to precise forms disclosed. Rather, the embodiments selected for description have been chosen to enable one skilled in the art to practice the invention. FIG. 1 shows an overview of an exemplary tomography system 101 operating with a single plasma plane 105. Exemplary tomography systems can be used to inspect areas remotely across a variety of terrain, elevations, and other environmental conditions. Exemplary systems 101 include a filament system 103 that can generate a plurality of filaments that are directed towards a reflection point to form a plasma plane 105. Plasma planes 105 are used to reflect EMR (e.g., RF energy, GPR) generated by an EMR system 107 (e.g., a radar transceiver) for surface penetration towards a target region 109. The plasma planes 105 can be created successively along a cone with a vertex at the laser. Reflection of the EMR off of these planes 105 can be focused at a variety of target regions 109 and at a variety of aspect angles without needing to move either Filament system 103 or EMR system 107. The EMR reflections are returned to the EMR system 107 via the reverse paths. The returned signals can then be processed by standard tomographic techniques (e.g. radix transforms) to generate an estimate of the sub-surface composition for that particular volume. Filament system 103 and EMR system 107 should be spaced apart so that the EMR can reflect off of plasma planes 105 at a variety angles.

Figure 2:
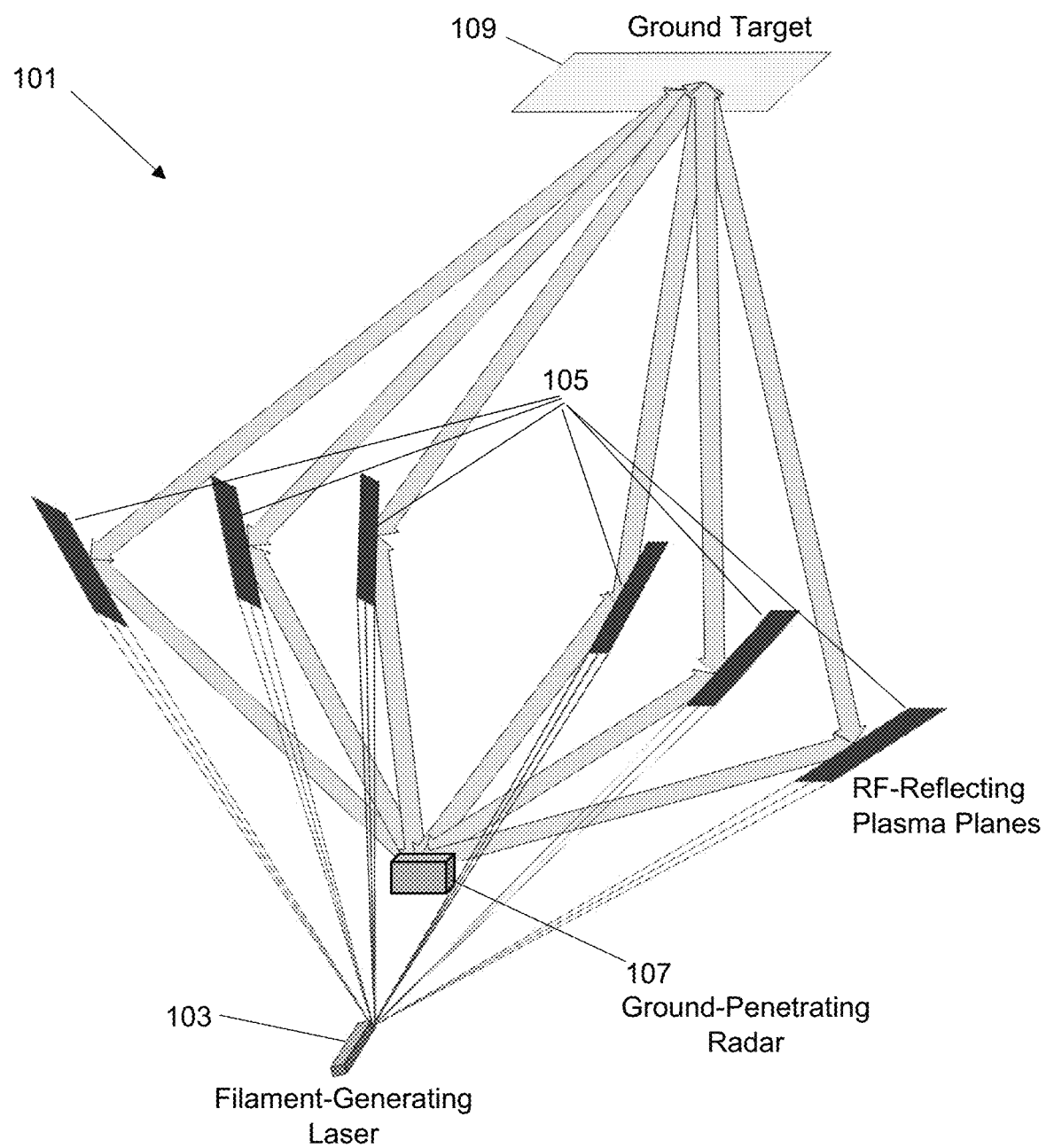
FIG. 2 shows an overview of an exemplary tomography system operating with multiple plasma planes.

FIG. 2 shows an overview of an exemplary tomography system 101 operating with multiple plasma planes 103. Filament system 103 can generate multiple pluralities of filaments such that a plurality of plasma planes 105 can form. EMR system 107 can then direct EMR towards multiple plasma planes 105 simultaneously. Exemplary systems can use the multiple plasma planes 105 to interrogate a single target region 109 from multiple angles. In other exemplary systems, multiple plasma planes 105 can be used to interrogate multiple target regions 109 simultaneously.

Figure 3:
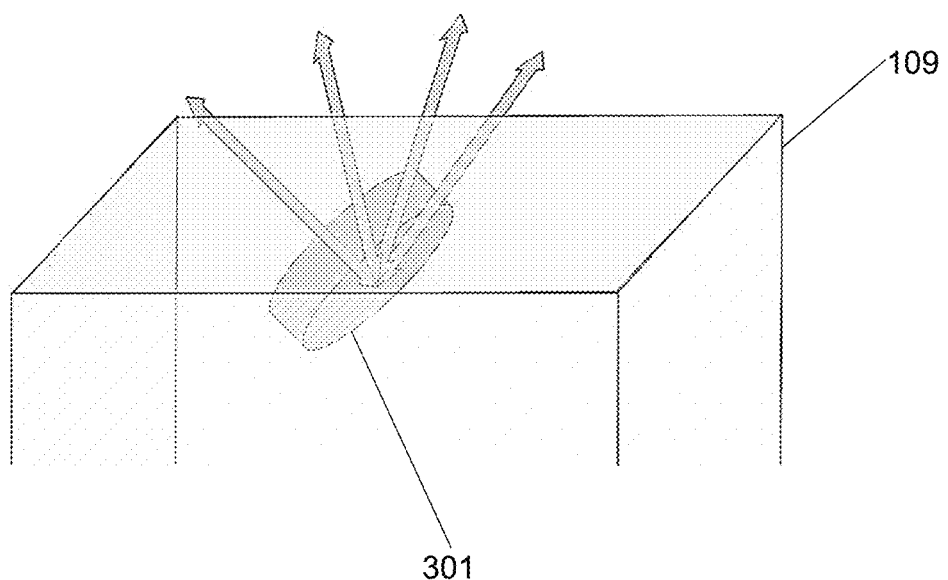
FIG. 3 shows an exemplary target region interrogated from multiple angles.

FIG. 3 shows an exemplary target region 109 interrogated from multiple angles. A target body 301 (e.g., a construct, a cavity, etc.) is shown embedded within target region 109. By utilizing GPR, exemplary systems can locate the presence of underground/subsurface objects, features, etc. and identify various attributes (e.g., size, dimensions, depth, etc.) of the discovered target bodies. A full 3-D picture can be generated by interrogating slightly offset volumes. This is accomplished by slightly varying the conic angle and skew of the plasma planes for varying ground-focus points.

Figure 4:
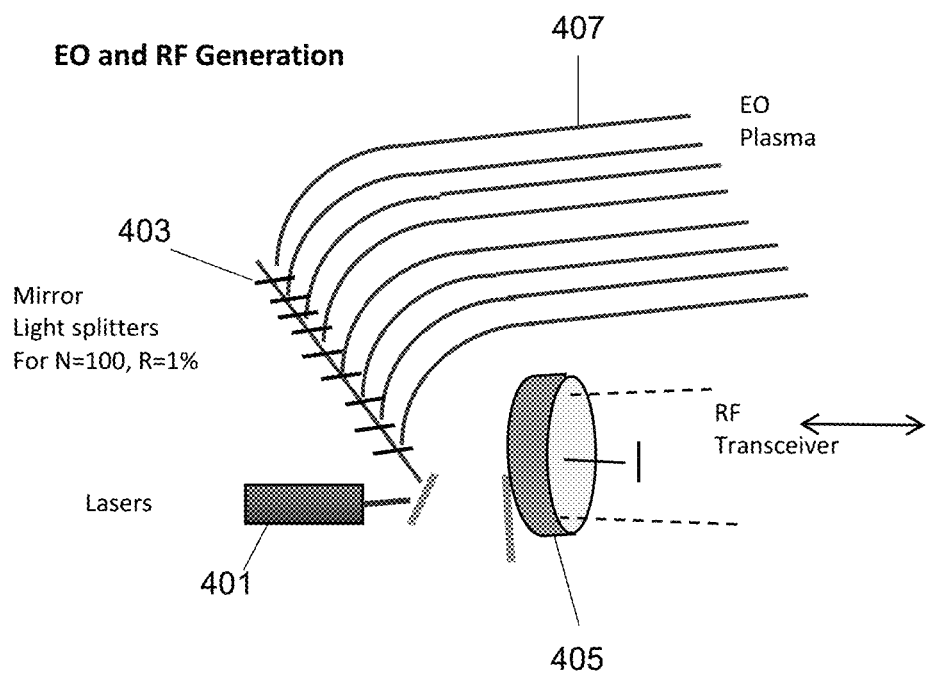
FIG. 4 shows exemplary components used in a tomography system.

FIG. 4 shows exemplary components used in a tomography system. Components of the tomographic system include laser systems 401, dichroic mirrors 403, and RF transceivers 405. Filaments 407 can be combined in parallel to form ion or plasma planes. The planes formed can be flat or curved by orientation or bending of filaments 407. The curvature of planes enables reflection of radar and operations without reliance on systems at two locations or use of ionosphere. High power ultra-short pulse lasers (USPL) have extremely high peak energy and nonlinear properties that give rise to ion formation. While the filament system and EMR system need to be spaced apart so that EMR will be able to reflect off of the plasma planes (as shown in FIG. 1), with filament curvature, the distance between the EMR system and filament system can be decreased compared to using flat planes without losing practical reflecting geometries. In addition, filament curvature allows a greater variety of interrogation angles at the target region.

The nonlinear properties of atmosphere ionization makes energy needs reasonable. The Kerr effect is the phenomena that describes the formation of filaments from ionization of atmosphere resulting is focusing of light giving rise to propagation for long ranges. The femtosecond lasers can be pulsed so that the max energies are well into non-linear domains. Free-electron plasmas can be created at densities up to around $10^{18}/cm^3$. Although the plasmas generated by 50 fs pulse duration lasers decay in 20-30 ns they can be reenergized with 10 ns pulse lasers in an energy efficient means. Continuous ionization creates conducting filaments, about 0.1 mm thick, that can be combined into reflecting planes.

Figure 5:
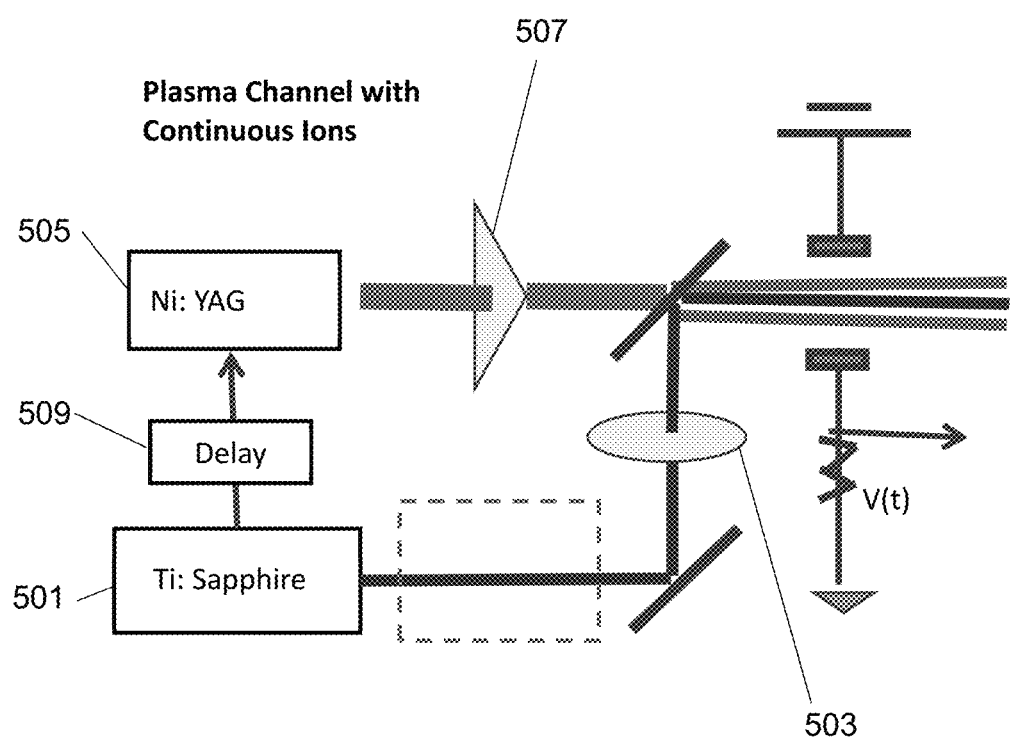
FIG. 5 shows an exemplary laser filament system for generating continuous filaments.

FIG. 5 shows an exemplary laser filament system for generating continuous filaments. A first laser 501 (e.g., Ti:Sa) focused by a first lens 503 generates a laser filament. A second laser 505 (e.g., Nd:YAG) focused by a second lens 507 can generate a counter-propagating laser that over laps the laser filament. Delay system 509 delays the timing between the first and second lasers 501, 505 to extend the lifetime of high density plasma in a filament.

Filaments are long lines of ionization. As laser pulses get shorter and shorter, the general trend is they propagate shorter distances in the atmosphere due to increasing dispersion effects. However, this trend can become dramatically reversed as the pulse lengths can approach femtosecond (fs) levels. The reason for this is a pair of opposing non-linear effects. As pulses become shorter while maintaining a constant energy per pulse, higher and higher energy densities can be created within the pulses. At femtosecond (fs) level pulses, a critical energy density can be reached, which can trigger an atmospheric Kerr Effect. A Kerr Effect is a second-order term of electromagnetic (EM) amplitude in the index-of-refraction expansion. Once the critical energy density is reached, the index of refraction starts increasing, causing the beam to start self-focusing. The beam width becomes dramatically smaller over a short propagation distance and the energy density dramatically increases.

Eventually, the energy density can become so high that the atmosphere spontaneously starts ionizing. Significant ionization occurs in this region via non-linear effects, and the atmosphere can even become fully ionized in a small volume. The presence of this copious ionization acts as a defocusing agent upon the beam. The beam then spreads as it propagates until there is not enough energy density to induce the cascading ionization events. However, the energy density is still greater than the Kerr critical density, so the beam starts self-focusing once again. This sequence of self-propagating events can continue for significant distances.

Typical fs lasers can induce filaments with just milliJoules (mJ) per pulse. These filaments have been observed to be stable over at least hundreds of meters. Also, by slowly converging the beam, filamentation can be induced as much as two kilometers from the laser. Often, multiple filaments can be produced from a single beam. Furthermore, filament persistence can be achieved at lower energy levels. This can be accomplished relatively easily by using an ultraviolet (UV) laser, but it should be appreciated that wavelength laser using the femtosecond pulsing scheme could be used. USPLs can ionize the atmosphere and create conducting filaments that can extend up to five kilometers. Pulsating fs filaments can be made continuous when combined with nanosecond lasers. Filaments are capable of bending through use of spectral planes. Spectral planes have been formed by parallel filaments. The construction of the system will vary filament energy, optical wave length, filament spatial density, curvature of planes formed and EMR parameters as appropriate for the tomography application.

Figure 6:
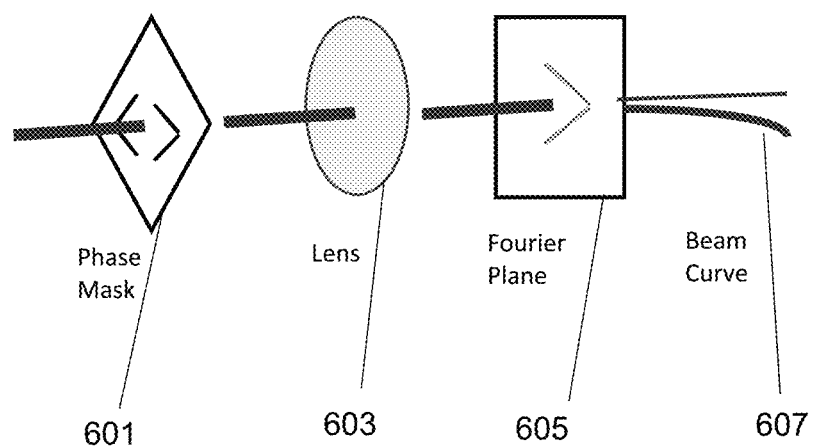
FIG. 6 shows an exemplary laser filament system for bending filaments.

FIG. 6 shows an exemplary laser filament system for bending filaments. A laser output is passed through phase mask 601. The resulting wavefront is subsequently focused by lens 603, and a spatial Fourier image of the field 605 is formed at the focal plane of the lens 603. The generated plasma channel 607 is curved, resulting in spatial separation of the emission down field.

Figure 7:
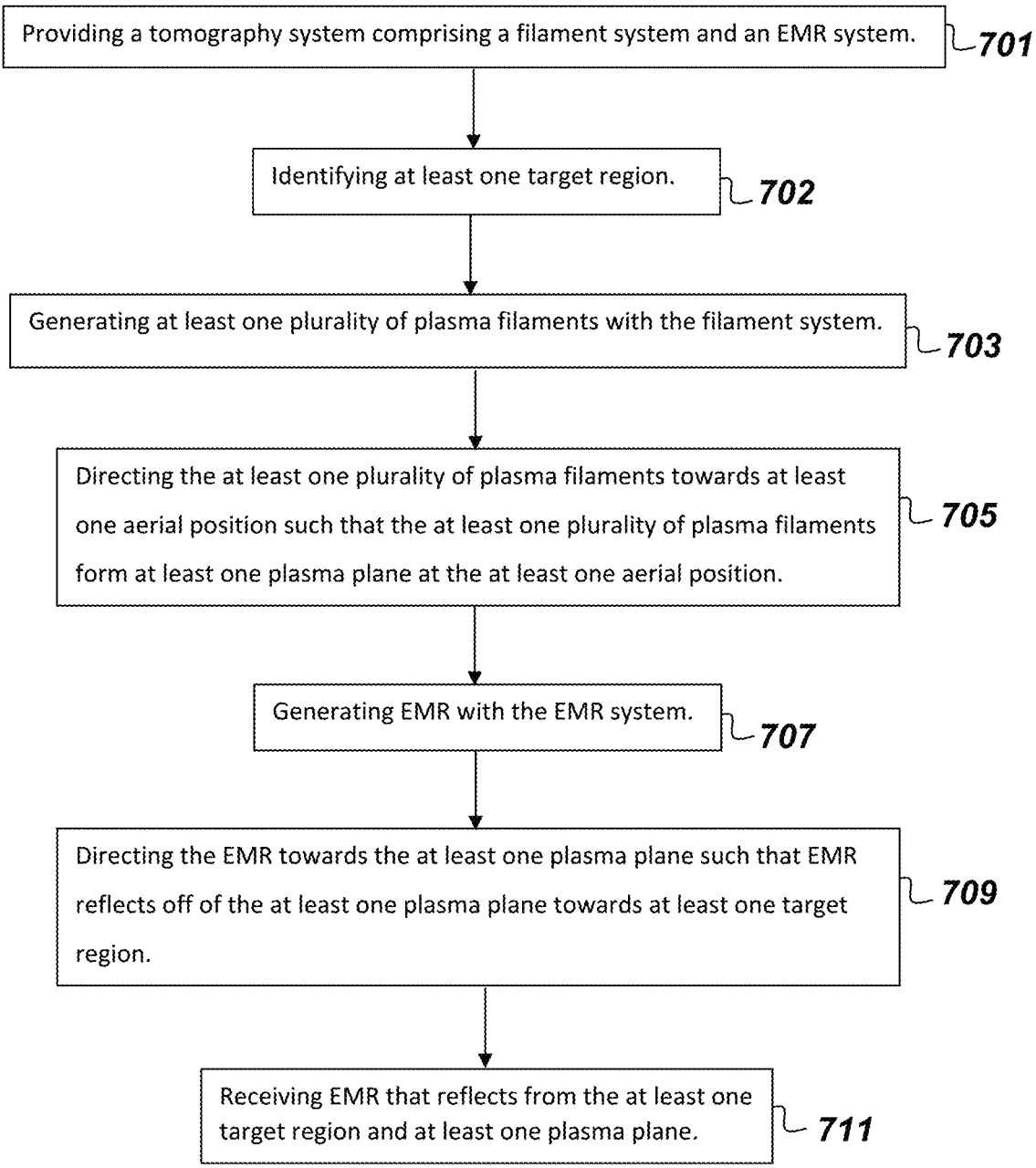
FIG. 7 shows an exemplary method for performing remote tomography.

FIG. 7 shows an exemplary method for performing remote tomography. At step 701, providing a tomography system comprising a filament system and an EMR system. At step 702, identifying at least one target region. At step 703, generating at least one plurality of plasma filaments with the filament system. At step 705, directing the at least one plurality of plasma filaments towards at least one aerial position such that the at least one plurality of plasma filaments form at least one plasma plane at the at least one aerial position. At step 707, generating EMR with the EMR system. At step 709, directing the EMR towards the at least one plasma plane such that EMR reflects off of the at least one plasma plane towards at least one target region. At step 711, receiving EMR that reflects from the at least one target region and at least one plasma plane.

There are a wide variety of tomography systems. Exemplary systems have the advantage of remote operation from a single platform without requiring translation over media such as by aircraft. Exemplary systems enable views of a medium without being directly overhead. An additional advantage of a stationary observation point is that measurements can be made of substrate to detect motions such as flows of water, lava, or seismic rock. Additional exemplary systems could be extended to other mediums and application domains.

Although the invention has been described in detail with reference to certain preferred embodiments, variations and modifications exist within the spirit and scope of the invention as described and defined in the following claims.

The invention claimed is:

1. A tomography system comprising:
    a filament system configured to generate at least one plurality of plasma filaments;
    an electromagnetic radiation (EMR) system configured to direct EMR towards the at least one plurality of plasma filaments such that the EMR reflects off the at least one plurality of plasma filaments towards at least one target region;

wherein the EMR system is configured to receive EMR reflected from the at least one plurality of plasma filaments.

2. The system of claim 1, wherein the at least one plurality of plasma filaments forms a plasma plane.

3. The system of claim 2, wherein the plasma plane is curved.

4. The system of claim 1, wherein the at least one plurality of plasma filaments comprises a plurality of plasma planes, wherein the EMR system is configured to direct EMR towards at least one plasma plane of the plurality of plasma planes.

5. The system of claim 4, wherein at least one plasma plane of the plurality of plasma planes is curved.

6. The system of claim 2, wherein the plasma plane forms at least 500 meters away from the filament system.

7. The system of claim 4, wherein each plasma plane of the plurality of plasma planes forms at least 500 meters away from the filament system.

8. A method of performing remote tomography comprising:
   (a) providing a tomography system comprising a filament system and an EMR system;
   (b) generating at least one plurality of plasma filaments with the filament system;
   (c) directing the at least one plurality of plasma filaments towards at least one aerial position such that the at least one plurality of plasma filaments form at least one plasma plane at the at least one aerial position;
   (d) generating EMR with the EMR system;
   (e) directing the EMR towards the at least one plasma plane such that EMR reflects off of the at least one plasma plane towards at least one target region; and
   (f) receiving EMR that reflects from the at least one target region and at least one plasma plane.

9. The method of claim 8, further comprising before step (b):
   (aa) identifying the at least one target region before generating the at least one plurality of plasma filaments with the filament system.

10. The method of claim 9, wherein the at least one aerial position is selected such that there is at least one optical path between the EMR system and the target region.

11. The method of claim 10, further comprising repeating steps (d) through (f) with different angles of incident upon the at least one plasma plane.

12. The method of claim 10, further comprising repeating steps (b) through (f) with the at least one plasma plane having a different orientation.

13. The method of claim 12, further comprising repeating steps (d) through (f) with different incident angles upon the at least one plasma plane.

14. A method of performing remote tomography comprising:
   (a) providing a tomography system comprising:
      a filament system configured to generate at least one plurality of plasma filaments;
      an electromagnetic radiation (EMR) system configured to direct EMR towards the at least one plurality of plasma filaments such that the EMR reflects off the at least one plurality of plasma filaments towards at least one target region;
      wherein the EMR system is configured to receive EMR reflected from the at least one plurality of plasma filaments;
   (b) generating the at least one plurality of plasma filaments with the filament system;
   (c) directing the at least one plurality of plasma filaments towards at least one aerial position such that the at least one plurality of plasma filaments form at least one plasma plane at the at least one aerial position;
   (d) generating EMR with the EMR system;
   (e) directing the EMR towards the at least one plasma plane such that EMR reflects off of the at least one plasma plane towards at least one target region; and
   (f) receiving EMR that reflects from the at least one target region and at least one plasma plane.

* * * * *